United States Patent
Ganu et al.

(10) Patent No.: US 11,086,857 B1
(45) Date of Patent: Aug. 10, 2021

(54) METHOD AND SYSTEM FOR SEMANTIC SEARCH WITH A DATA MANAGEMENT SYSTEM

(71) Applicant: Intuit Inc., Mountain View, CA (US)

(72) Inventors: Hrishikesh V. Ganu, Bangalore (IN); Aminish Sharma, Bangalore (IN)

(73) Assignee: Intuit Inc., Mountain View, CA (US)

( * ) Notice: Subject to any disclaimer, the term of this patent is extended or adjusted under 35 U.S.C. 154(b) by 580 days.

(21) Appl. No.: 15/980,475

(22) Filed: May 15, 2018

(51) Int. Cl.
| | | |
|---|---|---|
| *G06F 16/242* | (2019.01) | |
| *G06Q 40/00* | (2012.01) | |
| *G06F 16/2457* | (2019.01) | |
| *G06F 16/2452* | (2019.01) | |
| *G06F 40/30* | (2020.01) | |
| *G06F 40/295* | (2020.01) | |

(52) U.S. Cl.
CPC ........ *G06F 16/243* (2019.01); *G06F 16/2457* (2019.01); *G06F 16/24522* (2019.01); *G06F 40/295* (2020.01); *G06F 40/30* (2020.01); *G06Q 40/12* (2013.12)

(58) Field of Classification Search
CPC ...... G06F 16/243; G06F 40/295; G06F 40/30; G06F 16/24522; G06F 16/2457; G06Q 40/12
See application file for complete search history.

(56) References Cited

U.S. PATENT DOCUMENTS

| | | |
|---|---|---|
| 2008/0275834 A1 | 11/2008 | Zhong et al. |
| 2014/0325254 A1 | 10/2014 | Mani et al. |
| 2018/0032330 A9 | 2/2018 | Ryali et al. |
| 2018/0240125 A1 | 8/2018 | Karuppasamy |
| 2019/0130415 A1 | 5/2019 | Cheah et al. |
| 2020/0065151 A1 | 2/2020 | Ghosh et al. |
| 2021/0081442 A1 | 3/2021 | Ganu et al. |

FOREIGN PATENT DOCUMENTS

| | | | | |
|---|---|---|---|---|
| WO | WO-2012024580 A1 | * | 2/2012 | ......... G06F 16/3322 |

OTHER PUBLICATIONS

Deng, Advanced search system for IT support services, pp. 1-14 (Year: 2017).*
Bordawekar, Using Word Embedding to Enable Semantic Series in Relational Databases, pp. 1-4, May (Year: 2017).*
Zamani, Embedding-based Query Language Models, pp. 147-156, (Year: 2016).*
Zamani, Relevance-based Word Embedding, pp. 505-514, August (Year: 2017).*

(Continued)

*Primary Examiner* — Albert M Phillips, III
(74) *Attorney, Agent, or Firm* — Paradice and Li LLP

(57) ABSTRACT

A method and system provides assistance to users of a data management system. The method and system trains an analysis model with a machine learning process to generate sub-word embeddings corresponding to vectorized representations of portions of a search term entered by a user. The method and system generates augmented query data based on the sub-word embeddings. The method and system provides assistance to the user based on the augmented query data.

22 Claims, 4 Drawing Sheets

(56) References Cited

OTHER PUBLICATIONS

Quarteroni, Silvia et al., "A Chatbot-Based Interactive Question Answering System," Decalog 2007: Proceedings of the 11$^{th}$ Workshop on the Semantics and Pragmatics of Dialogue, pp. 83-90, Trento, Italy, 30 May-Jun. 1, 2007.

Golovin, Daniel et al., "Adaptive Submodularity: Theory and Applications in Active Learning and Stochastic Optimization," Journal of Artificial Intelligence Research 42 (2011), pp. 427-486; Jan. 2011.

Yano, Yuki et al., "Quantifying Query Ambiguity with Topic Distributions," Proceedings of the 25$^{th}$ ACM International Conference on Information and Knowledge Management, pp. 1877-1880; ACM, Oct. 24-28, 2016.

Zhou, Qi, et al., "Spark: Adapting Keyword Query to Semantic Search," K. Aberer et al. (Eds.): ISWC/ASWC 2007, LNCS 4825, pp. 694-707, 2007.

* cited by examiner

METHOD AND SYSTEM FOR SEMANTIC SEARCH WITH A DATA MANAGEMENT SYSTEM

BACKGROUND

Millions of people turn to electronic data management systems for assistance in managing various kinds of data. Electronic data management systems represent a potentially efficient and convenient way to manage data of many kinds. For example, millions of people turn to electronic data management systems for data management assistance including tax return preparation, bookkeeping, accounting, and financial transaction monitoring.

Users of data management systems often develop questions regarding data management topics or regarding features of the data management systems or related to data management topics. Accordingly, many traditional data management systems provide self-help functionality that enables users to obtain help related to various topics while using the data management systems. In particular, users can enter search queries into a search field and receive links to various assistance documents in response to the search queries. Users can then select assistance documents from among the search results. In this way, traditional data management systems offer a way for users to obtain assistance in using the services of the data management systems.

While these self-help features provided by traditional data management systems can sometimes assist users, all too often the self-help features provide inadequate or misguided assistance. Users often enter search queries that include colloquial terms that differ from standard terms used by data management professionals and included the assistance documents. In other cases, users enter search terms that are misspelled. In these cases, many traditional data management systems are unable to understand or identify the true intent of the users' queries. Because these traditional data management systems are unable to understand the true nature of the users' queries, the traditional data management systems provide assistance documents to the users that are not relevant to the true needs of the users.

To address this issue, some traditional data management systems maintain, for some common search terms, a predefined list of synonyms and common misspellings. The predefined list is generated by experts manually entering synonyms and common misspellings. If users use a colloquial term or a misspelling found in the list, then the traditional data management system may be able to identify relevant search terms and provide adequate assistance.

However, in many cases users enter queries that include words not found in the predefined list of synonyms, or that include a misspelling that is not found in the predefined list. In these cases, the traditional data management systems fail to identify the true intent of the users' queries. The traditional data management systems then return search results or provide assistance that is not relevant to the needs of the users.

When users do not receive the assistance that they desire from the self-help features of the traditional data management systems, both the data management systems and the users can face adverse consequences. Some users may become frustrated and confused and may abandon the traditional data management systems. Other users may continue entering additional search queries, thereby causing the data management systems to spend large amounts of computing resources in performing additional fruitless searches for assistance topics that will help the users. Still other users may decide to make a telephone call to the data management system and speak with an expert, a process that can be very expensive and time consuming to both the data management system's operators and to the users.

All of these drawbacks are a result of the technical inability of the traditional data management systems to properly understand the intent of the users' search queries when users enter uncommon terms or uncommon misspellings of terms. Accordingly, there exists a technical problem of correctly understanding the true intent of user queries and efficiently and effectively providing real time accurate assistance to users of data management systems. What is needed is a system and method that can provide a technical solution to the technical problem of technical problem of accurately identifying the needs of users.

SUMMARY

Embodiments of the present disclosure provide one or more technical solutions to the technical problem of correctly understanding the true intent of user queries and efficiently and effectively providing real time accurate assistance to users of data management systems. Embodiments of the present disclosure train an analysis model with a machine learning process to identify synonyms or words that are related to terms included in a user query. When a user of a data management system enters a query that includes an unrecognized or unusual term, the analysis model breaks the term into a plurality of sub-words and converts the sub-words to individual vectors. The analysis model then generates a combined vector that is the combination of the individual vectors. The analysis model then identifies words or terms, represented by other vectors, that are closest to the combined vector in a vector space. The words or terms that are closest to the combined vector in vector space are the words or terms that are most closely related to the combined vector. Embodiments of the present disclosure then provide assistance based on the terms most closely related to the combined vector, and thus reflective of the true intent of the user.

Embodiments of the present disclosure address some of the shortcomings associated with traditional data management. A data management system in accordance with embodiments of the present disclosure utilizes deep learning based sub-word embeddings in order to provide accurate assistance to users in a reduced amount of time. The various embodiments of the disclosure can be implemented to improve the technical fields of electronic data management, data processing, data transmission, and data storage. Therefore, the various described embodiments of the disclosure and their associated benefits amount to significantly more than an abstract idea. In particular, by providing accurate and assistance to users, electronic data management is significantly improved.

Figure 1:
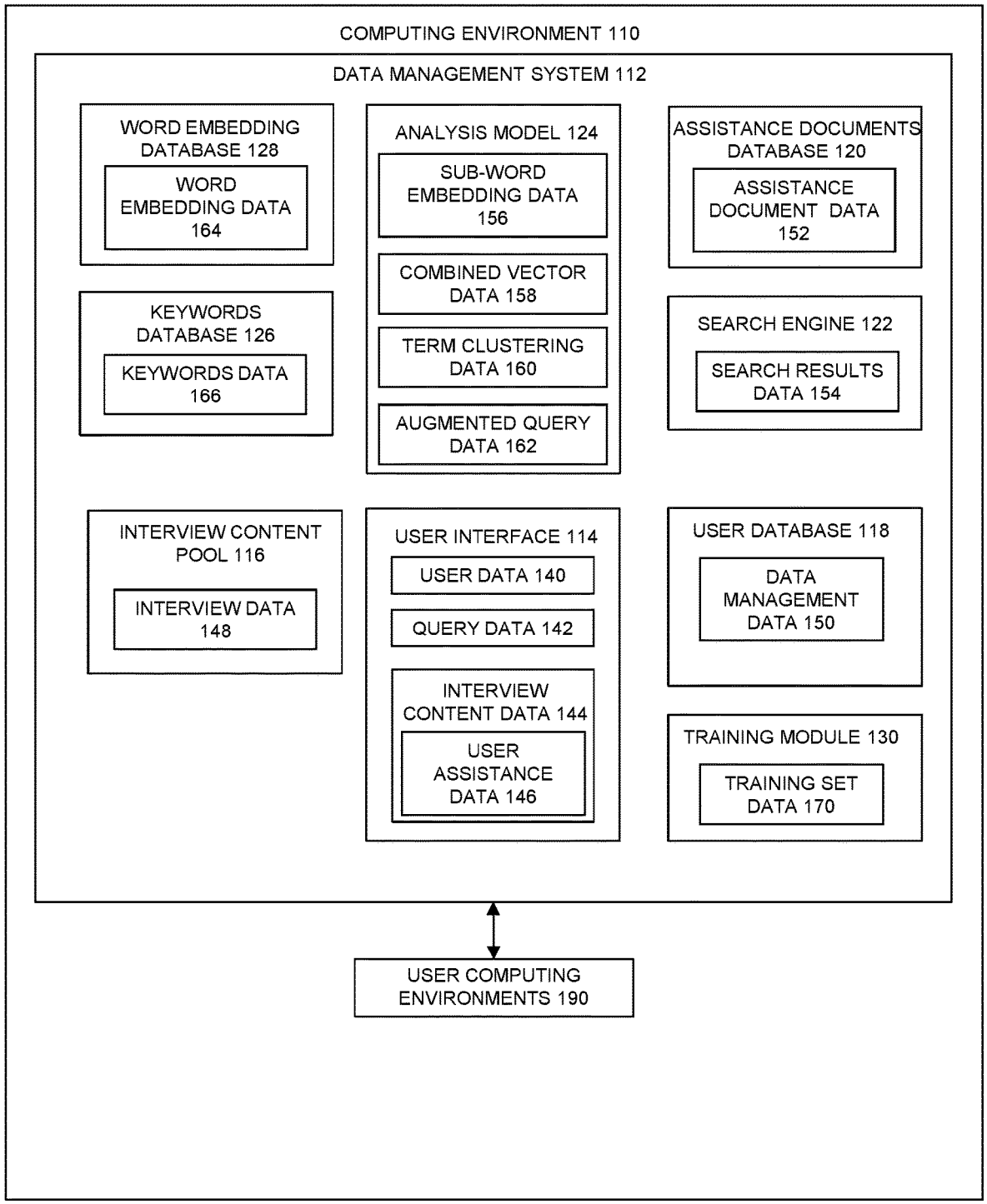
FIG. 1 is a block diagram of software architecture for accurately identifying the needs of users of a data management system, in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

Using the disclosed embodiments of a method and system for accurately identifying the needs of users of a data management system, a method and system for accurately identifying the needs of users of a data management system more accurately is provided. Therefore, the disclosed embodiments provide a technical solution to the long standing technical problem of correctly identifying the true intent of users' search queries and providing assistance to the users.

The disclosed embodiments of a method and system for accurately identifying the needs of users of a data management system are also capable of dynamically adapting to constantly changing fields such as data managements systems. Consequently, the disclosed embodiments of a method and system for accurately identifying the needs of users of a data management system also provide a technical solution to the long standing technical problem of static and inflexible data management systems.

The result is a much more accurate, adaptable, and robust method and system for accurately identifying the needs of users of a data management system. This, in turn, results in less human and processor resources being dedicated to providing assistance to users. Thus, embodiments of the present disclosure lead to the usage of fewer processing resources, usage of fewer memory storage assets, and less communication bandwidth being utilized to transmit data for analysis.

The disclosed method and system for accurately identifying the needs of users of a data management system does not encompass, embody, or preclude other forms of innovation in the area of data management. In addition, the disclosed method and system for accurately identifying the needs of users of a data management system is not related to any fundamental economic practice, fundamental data processing practice, mental steps, or pen and paper-based solutions, and is, in fact, directed to providing solutions to new and existing problems associated with data management systems. Consequently, the disclosed method and system for accurately identifying the needs of users of a data management system, does not encompass, and is not merely, an abstract idea or concept.

FIG. 1 illustrates a block diagram of a production environment 100 for accurately identifying the needs of users of a data management system, according to one embodiment.

Embodiments of the present disclosure provide methods and systems for accurately identifying the needs of users of a data management system, according to one embodiment. In particular, embodiments of the present disclosure utilize machine learning processes to train an analysis model to identify terms that are related to the terms included in users' queries by generating sub-word embeddings. When the data management system receives a query from a user, the analysis model analyzes a term from the query. The analysis model generates a plurality of sub-word embeddings for the term. Each sub-word embedding is a vector corresponding to a portion of the term. The analysis model combines the vectors representing the sub-words into a combined vector. The analysis model identifies one or more vectors that are closest to the combined vector in the vector space. The vectors in the vector space each correspond to a respective term known to the data management system. The closest vectors in the vector space represent the terms that are most closely related to the search term represented by the combined vector. The analysis model generates augmented query data including the one or more closely related terms. The data management system performs a search among assistance documents based on the augmented query data. In this manner, the data management system generates search results that are likely to be relevant to the true intention of the user.

Embodiments of the present disclosure utilize the analysis model to accurately understand the intent of a user's query even when the query includes words or terms that are unknown or include novel misspellings. Thus, by analyzing individual portions of a word from the query data, the analysis model is able to accurately understand the intent of a user even when the query data uses language not typically included in assistance documents maintained by the data management system.

In one embodiment, the data management system also maintains a keyword database. The keyword database includes, for each of a plurality of keywords associated with the data management system, a list of related terms, synonyms, and common misspellings. When the data management receives query data from a user, the data management system searches the keyword database for each term included in the query data. If, for a given term from the query data, the keyword database includes the term among the known related terms or known misspellings, then the data management system can perform a search among the assistance documents based on related terms from the keyword database.

In one embodiment, the data management system utilizes the analysis model as a supplement to searching among the keywords database. For example, if a term from the query data is not found among the keyword database as either a keyword, a word related to a keyword, or a known misspelling of a keyword or a word related to a keyword, then the data management system utilizes the analysis model to identify words or terms related to the term from the query data by generating and analyzing the sub-word embeddings. The analysis model can identify terms related to the term from the query data even when the term was previously unknown to the data management system. Thus, in one embodiment, the data management system utilizes a hybrid approach to identifying the true intent of a user's query by searching among the keyword database and utilizing the analysis model to generate and analyze the sub-word embeddings.

In one embodiment, the data management system utilizes the analysis model to generate the sub-word embedding for a term, only when a search among the keyword database does not identify related terms. In one embodiment, the data management system utilizes the analysis model to generate the sub-word embedding for a term even when a search among the keyword database identifies related terms.

In one embodiment, after the analysis model identifies one or more related terms based on the sub-word embeddings, the data management system references the keyword database to find further synonyms and related words based on the previously generated keyword data, rather than having the analysis model identify a full list of related words and synonyms based on the sub-word embeddings in real time at the time the query is received. This hybrid approach to generating augmented query data greatly reduces the amount of processing required by the analysis model at query time. This, in turn, enables the data management system to provide accurate search results to users far more quickly than if the data management system relied entirely on deep learning based embedding generation and analysis to generate the fully augmented query data at query time.

In one embodiment, the data management system maintains an assistance documents database. The assistance document database includes assistance document data corresponding to a large number of assistance documents. Each assistance document provides assistance related to one or more topics related to the data management system.

In one embodiment, when the data management system receives query data from a user corresponding to a search by the user for assistance related to the data management system, the data management system searches among the assistance documents database for assistance documents most related to the query data. In particular, the data management system searches among the assistance documents database based on the augmented query data that includes additional terms related to the terms from the query data as identified by the analysis model based on the sub-word embeddings.

In one embodiment, the data management system trains the analysis model with a deep learning machine learning process to generate multiple sub-word embeddings for a term and to identify additional terms most closely related to the term based on the sub-word embeddings. In one embodiment, the data management system trains the analysis model to identify additional terms by executing one or more clustering algorithms.

In one embodiment, the analysis model includes multiple analysis sub models. Each sub-model is trained with a respective machine learning process, such as a supervised, unsupervised, or deep learning unsupervised machine learning process. In one embodiment, each sub-model performs a portion of the analysis. In one embodiment, the analysis model utilizes two or more of the sub models in identifying additional terms related to the terms of the query data. In one embodiment, the analysis model utilizes only a single sub model in identifying additional terms are related to the terms of the query data. In one embodiment, each sub model can be considered a separate analysis model.

In one embodiment, the data management system provides assistance data to the user in the form of providing search results to the user based on the analysis of the analysis model. In one embodiment, the data management system provides assistance to the user by providing data from one or more assistance topics identified as being relevant to the user based on the analysis of the analysis model.

In addition, the disclosed method and system for accurately identifying the needs of users of a data management system provides for significant improvements to the technical fields of data management, data processing, and data transmission.

In addition, as discussed above, the disclosed method and system for accurately identifying the needs of users of a data management system provides for the processing and storage of smaller amounts of data related to providing assistance to the users. Because relevant assistance topics are identified efficiently, fewer system resources are devoted to performing additional searches based on inadequate initial search results. Consequently, using the disclosed method and system for accurately identifying the needs of users of a data management system results in more efficient use of human and non-human resources, fewer processor cycles being utilized, reduced memory utilization, and less communications bandwidth being utilized to relay data to, and from, backend systems and client systems, and various systems and parties. As a result, computing systems are transformed into faster, more efficient, and more effective computing systems by implementing the method and system for accurately identifying the needs of users of a data management system.

As seen in FIG. 1, the production environment 100 includes a computing environment 110. The computing environment 110 represents one or more computing systems such as a server, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to various embodiments.

In one embodiment, the computing environment 110 includes a data management system 112. The data management system 112 can include a user interface 114, an interview content pool 116, a user database 118, an assistance documents database 120, a search engine 122, an analysis model 124, a keywords database 126, a word embedding database 128, and a training module 130, according to various embodiments.

In one embodiment, the data management system 112 is an electronic data management system that assists users to manage their data. In one embodiment, the data management system 112 is a financial management system. The financial management system can include one or more of a tax return preparation system, a bookkeeping system, an accounting system, and a financial transaction monitoring system, according to various embodiments. Users provide their financial data to the financial management system and the financial management system provides financial management services to the users.

In one embodiment, the data management system 112 utilizes the user interface 114 to enable the users of the data management system 112 to interact with the data management system 112. The user interface 114 enables users to access the data management services of the data management system 112. The user interface 114 enables users to provide data and instructions to the data management system 112. The user interface 114 enables the data management system 112 to provide data to the users in conjunction with the data management services provided by the data management system 112.

In one embodiment, the user interface 114 enables the data management system 112 to interface with user computing environments 190. The user computing environments 190 include computing environments utilized by users of the data management system 112. The user computing environments include one or more of desktop computing devices, mobile phone computing devices, tablet computing devices, laptop computing devices, and cloud-based computing devices. The user computing environments 190 include computing environments utilized by users of the data management system 112 to access the data management services of the data management system 112. The user computing environments 190 access the data management system 112 via the user interface 114 in order to provide data to the data management system 112 and to receive data from the data management system 112.

In one embodiment, one or more components of the data management system 112, or portions of one or more components of the data management system 112, are implemented in the user computing environments 190. Thus, in one embodiment, some of the processing, software, and memory resources associated with functionality of the data management system 112 are implemented in the user computing environments 190.

In one embodiment, users of the data management system 112 receive a data management interview from the data management system 112 via the user interface 114. Users provide user data 140 to the data management system 112 via the user interface 114. The data management system 112 provides interview content data 144 to the users via the user interface 114. The user data 140 can include personal information related to the user, demographics data related to the user, and data that the user wishes to be managed by the data management system 112. The user may provide user data 140 in response to questions posed by the data management system 112 during the data management interview. In an example in which the data management system 112 is a financial management system, the user data 140 can include financial data of the user related to the financial management services provided by the financial management system.

In one embodiment, the data management system 112 includes an interview content pool 116. The interview content pool 116 includes interview data 148. The interview data 148 guides a user through a series of data management topics, asks questions, and invites the user to provide data related to data management topics and questions. The user interface 114 populates the interview content data 144 from the interview data 148. The interview content pool 116 includes topics, questions, and user experience elements that can be presented to the user during the data management interview.

In one embodiment, the data management system 112 includes a user database 118. The user database 118 includes data management data 150. The data management data 150 includes data received from the user, or related to the user, for data management purposes. In an example in which the data management system 112 is a tax return preparation system, the data management data 150 can include tax related data provided by the user, such as W-2 information, income information, investment information, charitable donations, work-related deductions, and other kinds of tax related data that can be collected from the user or related to a user for purposes of preparing a tax return for the user. Accordingly, the data management data 150 includes the type of data provided by the user for receiving data management services from the data management system 112.

In one embodiment, the data management system 112 includes an assistance documents database 120. The assistance documents database 120 includes assistance document data 152. In one embodiment, the assistance document data 152 includes a plurality of assistance documents. The assistance documents include assistance topics as well as solutions to problems related to the assistance topics. Each assistance document corresponds to an assistance topic with one or more solutions or answers related to the assistance topic.

In one embodiment, the assistance documents database 120 is a social question-and-answer database. In a social question-and-answer database, each assistance document corresponds to a question or query provided by a user of the data management system 112. In the social question answer database, the answers or solutions to a query made by a user are provided by other users of the data management system 112. A single assistance document can include multiple answers or solutions provided by various users of the social question-and-answer support system.

In one embodiment, an assistance document includes answers provided by regular users of the data management system 112, or by users that have been designated as trusted users of the data management system 112. Furthermore, in one embodiment, an assistance document includes answers provided by experts or other personnel associated with the data management system 112.

In one embodiment, each assistance document from the assistance document data includes a query. The query corresponds to the search query provided by the user that originally generated the assistance document. The query can include a question, a full statement, or one or more search terms. Thus, the query can include full sentences, sentence fragments, or even an individual word or two. Furthermore, sentences can be grammatically correct or incorrect, can include or not include punctuation marks, can be well formulated or poorly formulated, or have other characteristics that may differentiate assistance documents in terms of quality or intent.

In one embodiment, each assistance document from the assistance document data 152 includes answer data. The answer data includes the answers or solutions provided by users, trusted users, or personnel associated with the data management system 112. An assistance document may include a single answer, multiple answers, or no answer at all. An assistance document can also include optional comments. In addition, an assistance document may have a comment, but no answers.

In one embodiment, users of the data management system 112 can provide query data 142 to the data management system 112. The query data 142 corresponds to a query from the user for assistance from the data management system 112 related to one or more aspects of the data management system 112. The query data 142 can include one or more search terms. When a user of the data management system 112 provides query data 142, the data management system 112 provides user assistance data 146 to the user in response to the query. Accordingly, the data management system 112 enables users to provide queries and to receive assistance in response to the queries, as will be set forth in more detail below.

In one embodiment, the data management system 112 includes a search engine 122 to assist in providing user assistance data 146 to users in response to receiving query data 142 from the users. In particular, when the user provides query data 142, the search engine 122 performs a search of the assistance documents database 120 in order to identify assistance documents that are relevant to the query data 142. As will be set forth in more detail below, in one embodiment, the search engine 122 cooperates with the analysis model 124 to identify assistance documents that are relevant to the user.

In one embodiment, the search engine 122 generates search results data 154 in response to the query data 142 and in cooperation with the analysis model 124. In one embodiment, the search results data 154 includes one or more assistance documents, or links to one or more assistance documents, likely to be relevant to the user based on the query data 142 and the user attributes data.

In one embodiment, the data management system 112 includes multiple search engines 122. Each search engine 122 can be specialized to search for assistance documents that correspond to particular assistance topics. Generating the user assistance data 146 can include selecting, with the analysis model 124, a search engine 122 based on the user data and the query data 142. In one embodiment, the search engine 122, or search engines 122, are part of the analysis model 124. In one embodiment, the multiple search engines may include multiple search rankers. Each search ranker is trained on the data collected for a particular sub-domain.

In one embodiment, the data management system 112 utilizes the analysis model 124 to assist in providing user assistance data 146 to users of the data management system 112 in response to receiving query data 142. The analysis model 124 generates user assistance data 146 based on analysis of the query data 142.

In one embodiment, users of the data management system 112 may provide query data 142 that includes inquiries that, taken by themselves, can be difficult to properly understand. For example, users of the data management system 112 often use words that are different than the words typically used in the data management field associated with the data management system. Experts in the data management field often used words that correspond to industry standard words. The assistance documents from the assistance documents database 120 typically include verbiage that is standard to the data management field or industry associated with the data management system 112. In an example in which the data management system 112 is an accounting system or a tax return preparation system, the assistance documents utilizing standard accounting or tax terms. Users of the data management system, on the other hand, are often unfamiliar with standard accounting and tax terms and instead use their own colloquialisms when entering the query data 142.

As set forth previously, traditional data management systems typically fail to identify the true intent of a user's query when that query includes terms that are unknown to the data management system, or when the query includes unknown misspellings. The data management system 112 utilizes the analysis model 124 to overcome these drawbacks of traditional data management systems. The analysis model 124 is able to identify the true intent of the user's query even when the query includes unknown words or unknown misspellings.

In one embodiment, the data management system 112 trains the analysis model 124 with one or more machine learning processes to assist in accurately identifying assistance topics related to the query data 142 received from the user. In one embodiment, the analysis model 124 is able to execute one or more algorithms, processes, or models based on the one or more machine learning processes in order to assist in identifying assistance topics that are likely to be relevant to users that submit query data 142.

In one embodiment, the analysis model 124 selectively utilizes one or more available algorithms or processes based on the query data 142 and the user attributes data. For example, the analysis model 124 may execute a first algorithm and identify one or more additional terms related to a query provided by the user. The analysis model 124 may then determine that additional analysis utilizing other algorithms is not necessary. Alternatively, the analysis model 124 may execute a first algorithm and initially identify additional terms that are related to the query data 142. The analysis model 124 may then proceed to analyze the query data 142 in accordance with one or more additional algorithms or processes in order to identify additional terms related to the query data 142.

In one embodiment, the data management system 112 generates user assistance data 146 based on the augmented query data by selecting one or more assistance documents from the assistance document data 152 that are relevant to the augmented query data 162. The data management system 112 then provides user assistance data 146 to the user including the identified assistance documents from the assistance document data 152, portions of the assistance documents, or links to the assistance documents.

In one embodiment, the data management system 112 generates user assistance data 146 based on the augmented query data 162 by selecting a search engine from the plurality of search engines 122 in accordance with the augmented query data 162. The selected search engine 122 then performs a search among the assistance document data 152 based on the augmented query data 162. The selected search engine 122 generates search results data 154 indicating one or more assistance documents from the assistance document data 152. The data management system 112 then outputs user assistance data 146 to the user including the identified assistance documents from the search results data 154, portions of the assistance documents from the search results data 154, or links to the assistance documents from the search results data 154. In one embodiment, the user assistance data 146 is the search results data 154.

In one embodiment, the data management system 112 includes a keywords database 126. The keywords database 126 includes keywords data 166. The keywords data 166 includes, for each of a large number of keywords associated with the data management system, a list of related terms and known misspellings.

In an example in which the data management system 112 is a bookkeeping system, the keywords data 166 may include the keyword "invoice". The keywords data 166 includes, for the word invoice, a list of words that are related to the word invoice, that are synonyms of the word invoice, or that are known misspellings of the word invoice. For the word "invoice", the keywords data 166 may include the related words "bill", "billing", "account", "accounting", "payment", "invoicing", and other words that are synonyms or are closely related to the word "invoice". The keywords data 166 may include, for the word "invoice", known misspellings such as "invoce", "invice", and "invoiece".

In one embodiment, once the data management system 112 receives query data 142 from a user, the analysis model 124, or another model or subsystem of the data management system 112, searches among the keywords database 126 for words or terms that are related to the terms included in the query data 142. The analysis model 124 identifies, for one or more of the terms in the query data 142, related terms as indicated by the keywords data 166. The analysis model 124 generates augmented query data 162 that includes both the original terms from the query data 142 and the additional related terms from the keywords data 166.

In one example, a user submits query data 142 including "make invoice". The analysis model 124 searches among the keywords data 166 and identifies, for the term "make", the additional related term "generate". For the term "invice", the analysis model identifies the properly spelled version "invoice", as well as other related terms indicated in the keywords data 166. The analysis model 124 generates augmented query data 162 including the additional related terms. The search engine 122 performs a search among the assistance documents database 120 based on the augmented query data 162 and generates search results data 154 including one or more assistance documents related to the augmented query data 162.

In one example, a user submits query data 142 including the term "invoiece", a misspelling of the word "invoice". The analysis model 124 searches among the keywords data 166 and does not find any related terms because "invoiece" is not listed among the known misspellings of "invoice". The analysis model 124 does not identify any additional terms from the keywords data 166 because "invoiece" is not found in the keywords data 166.

In one embodiment, the analysis model 124 utilizes an additional process to identify terms related to terms from the query data 142 in order to supplement the search among the keywords database 126. Thus, in cases in which the analysis model 124, or other model or subsystem of the data management system 112, is not able to identify related terms from the keywords database 126, the analysis model 124 can still identify additional related terms generate augmented query data 162.

In one embodiment, the data management system 112 includes a word embedding database 128. The word embedding database 128 includes word embedding data 164. The word embedding data 164 includes a plurality of vectors. Each vector in the word embedding data 164 represents a term or word. Thus, the word embedding data 164 includes, for each of a large number of words or terms found in the assistance documents database 120, a corresponding vector.

In one embodiment, the vector for a word is generated based on the contexts in which the word is found among the assistance documents included in the assistance documents database 120. Words used in similar contexts will have similar vectors. Thus, the closeness in relation between two words can be identified by how close their corresponding vectors are to each other in the vector space.

In one embodiment, the vectors in the word embedding data 164 may include a large number of data fields. The vector space includes a number of dimensions corresponding to the number of data fields included in the vectors. For example, if each vector has 100 data fields, then the vector space has 100 dimensions. Thus, each word or term is embedded as a vector in the vector space.

In one embodiment, the analysis model 124 utilizes the word embedding database 128 to identify additional terms related to a term from the query data 142. In particular, the analysis model 124 generates sub-word embedding data 156 for a term from the query data 142. The sub-word embedding data includes a plurality of sub-word embeddings for the term. In particular, the analysis model 124 separates the term or word into a series of sub-words and generates a vector for each sub-word. The sub-word embedding data 156 includes all of the vectors that are generated for the sub-words corresponding to the portions of the term from the query data. The analysis model compares the sub-word embedding data 156, or data based on the sub-word embedding data 156, to the word embedding data 164 in order to identify terms that are related to the term from the query data 142. The analysis model 124 generates augmented query data 162 including one or more additional terms based on the sub-word embedding data 156 and the word embedding data 164.

In an example in which a user submits query data 142 including the term "invoiece", the analysis model 124 generates sub-word embedding data 156 for the term "invoiece". In particular, the analysis model 124 separates "invoiece" into the sub-words "in", "nv", "vo", "oi", "ie", "ec", and "ce". The analysis model 124 generates a vector representation for each of the sub-words. The sub-word embedding data 156 includes these vector representations. Alternatively, or additionally, the analysis model 124 can separate the term into sub-words each including three or more characters and generates respective vectors for those sub-words.

In one embodiment, the analysis model 124 identifies related terms for the term from the query data based on a combination of the sub-word embeddings from the sub-word embedding data 156 for the term. The analysis model 124 identifies vectors from the word embedding data 164 that are close to the combination of vectors from the sub-word embedding data 156. In this way, the analysis model 124 identifies additional terms related to the term from the query data 142.

In one embodiment, the analysis model 124 generates combined vector data 158 based on the sub-word embedding data 156. In particular, the combined vector data 158, for a term from the query data 142, corresponds to a vector that is the combination or sum of all the vectors from the sub-word embedding data 156 for the term. The analysis model 124 identifies related terms by identifying vectors from the word embedding data 164 that are closest to the combined vector from the combined vector data 158. The vectors that are most similar to the combined vector correspond to terms that are most closely related to the term from the query data 142 represented by the combined vector.

In an example in which a user submits query data 142 including the term "invoiece", the combined vector data 158 includes a vector that is a combination of the vectors corresponding to the sub-words generated from the term "invoiece". If the analysis model 124 has generated sub-word embedding data 156 including vectors for each of the sub-words "in", "nv", "vo", "oi", "ie", "ec", and "ce", then the combined vector data 158 includes a vector that is the sum of all of these sub-word vectors, in one embodiment.

In one embodiment, the analysis model 124 generates term clustering data 160. The term clustering data 160 indicates the words or terms from the word embedding data 164 whose vectors are most similar to the combined vector from the combined vector data 158. The analysis model 124 can select one or more of the words or terms represented in the term clustering data 160 inclusion in the augmented query data 162. In one embodiment, the augmented query data 162 includes every term from the term clustering data 160. In one embodiment, the augmented query data 162 includes only the terms most closely related to the combined vector from the combined vector data 158. In one embodiment, the augmented query data 162 includes only those terms that meet a threshold closeness to the combined vector from the combined vector data 158.

In the example in which the combined vector data 158 includes, for the term "invoiece", a vector that is the combination of the sub-word embeddings for "in", "nv", "vo", "oi", "ie", "ec", and "ce", the term clustering data 160 may include the terms "invoice", "invoicing", "bill", and "billing". The analysis model 124 generates augmented query data 162 including these additional terms. Thus, even though the user provided query data 142 that included a word "invoiece" that did not appear as a known misspelling of any word in the keywords data 166, the analysis model 124 was still able to identify terms that are related to "invoiece". The analysis model 124, therefore, was able to identify the true intention of the user's query.

In one embodiment, not only does the use of sub-word embeddings enable the analysis model 124 to understand the intent behind novel misspellings, but the analysis model 124 can utilize the sub-word embeddings to identify related terms for terms that are merely unusual colloquialisms. If the query data 142 includes a term or phrase that does not appear in the keywords data 166, or if a search among the keywords data 166 does not provide satisfactory additional related terms, the analysis model 124 can generate sub-word embedding data 156 in order to identify additional related terms, as described above.

In one embodiment, the analysis model 124 generates sub-word embedding data 156 for terms that includes multiple words. The analysis model 124 generates sub-word embedding data 156 for each word included in the term and generates combined vector data 158 including a single vector that is the combination of all sub-word vectors for the multiword term. Likewise, the term clustering data 160 can identify terms that include more than one word. Thus, the word embedding data 164 can include vectors generated from multiple words, in one embodiment.

In one embodiment, the analysis model 124 can generate sub-word embedding data 156 for a term that includes symbols other than letters. A single term may include combinations of letters, numbers, punctuation, and other symbols. The analysis model 124 can generate sub-word embedding data 156, combined vector data 158, and term clustering data 160 these terms in order to generate the augmented query data 162.

In one embodiment, the analysis model 124 uses one or more of a skip-gram model, a Continuous Bag of Words (CBOW) model, a Word2vec, Doc2vec, or Sentence2vec model to generate the sub-word embedding data 156. The data management system 112 trains one or more of these models in accordance with a deep learning unsupervised machine learning process. In one embodiment, the analysis model 124 generates the word embedding data 164 for the word embedding database 128. In one embodiment, the data management system 112 utilizes another model to generate the word embedding data 164 consistent with the vectorization processes utilized by the analysis model 124.

In one embodiment, the analysis model 124 generates the term clustering data 160 by applying a clustering algorithm to the combined vector data 158 and the word embedding data 164 in accordance with a deep learning unsupervised machine learning process in order to identify terms that are related to the term under analysis from the query data 142.

In one embodiment, the clustering algorithm includes a K-nearest neighbor algorithm. The K-nearest neighbor algorithm is applied to the vectorization data combined vector data 158 and the word embedding data 164 in order to identify the K-nearest neighbors of the combined vector in the vector space. The K-nearest neighbor algorithm clusters the vectors based on the K nearest neighbors of each vector. In one embodiment, the K nearest neighbor algorithm finds the K nearest neighbors of a vector by calculating the Euclidean distance between vectors. In one embodiment, the K nearest neighbor algorithm determines proximity of vectors by calculating the overlapping metric or Hamming distance.

In one embodiment, the analysis model 124 generates all or a part of the keywords data 166 included in the keywords database 126. For example, the analysis model can generate the keywords data 166 by performing, for each selected keyword, a clustering algorithm to identify the k nearest neighbors of the keyword in the word embedding data 164. Thus, the keywords data 166 can include, for each keyword, a list of synonyms or related words as identified by the analysis model 124. Experts can also augment or revise the keywords data 166.

In one embodiment, the keywords database 126 includes a search index that enables searching for either an exact word or synonyms. In one embodiment, customer care experts create a hand curated list of important words including named entities, actions that customers perform with products and services associated with the data management system 112, etc. In one embodiment, the analysis model 124 generates word embeddings and sub-word embeddings from data associated with the data management system 112 and uses the embeddings to create nearest neighbors for the important words.

In one embodiment, the data management system uses a synonym contraction mechanism to update the index of synonyms. During the search, the query is also analyzed using the same analyzer. For out of vocabulary words at query time the data management system gets synonyms using the sub-word embeddings. In one embodiment, nearest neighbors are generated by first generating a handcrafted set of important words or keywords. The data management system 112 includes or generates a hash map of the words included in the set of keywords.

Embodiments disclosed herein include a hybrid method and system combining sub-word embeddings with the search for more effective query expansion that, in one embodiment, is implemented as an end-end system. Consequently, using the disclosed embodiments, synonyms can be completely customized to the user's dataset.

In one embodiment, after the analysis model 124 identifies one or more related terms based on the sub-word embeddings, the data management system 112 references the keyword database 126 to find further synonyms and related words based on the previously generated keywords data 166, rather than having the analysis model 124 identify a full list of related words and synonyms based on the sub-word embeddings in real time at the time the query is received. This hybrid approach to generating augmented query data 162 greatly reduces the amount of processing required by the analysis model at query time. This, in turn, enables the data management system to provide accurate search results to users far more quickly than if the data management system relied entirely on deep learning based embedding generation and analysis to generate the augmented query data at query time.

In one embodiment, the hybrid approach of utilizing deep learning based generation of sub-word embeddings at query time combined with referencing a previously generated keyword database to generated augmented query data reduces search time by an order of magnitude or more in comparison to a method that utilizes deep learning based embeddings and analysis at query time in order to identify the full list of synonyms and related terms at query time. In one set of tests, the inventors identified that the hybrid approach, in accordance with principles of the present disclosure, returned search results in 50 ms, compared to more than 300 ms when utilizing deep learning based embeddings and analysis at query time in order to identify the full list of synonyms and related terms at query time.

In addition, using the disclosed embodiment, Out Of Vocabulary (OOV) words can be more readily handled. In a comparative study the Inventors found that this approach, when applied to a self-help system database, was able to provide an answer to 15-30% more questions than standard search systems (which don't rely on semantic matching).

In one embodiment, the data management system 112 includes a training module 130. The training module 130 trains the analysis model 124, according to an embodiment.

In one embodiment, the training module 130 includes training set data 170. The training set data 170 includes a corpus of text related to a data management field associated with the data management system 112. The training set data 170 can include data from the assistance documents database 120, a corpus of public data including a large body language related to a data management field associated with the data management system 112, or another source of data management vocabulary.

In one embodiment, the training module 130 uses the training set data 170 to train the analysis model 124. In particular, the training module 130 uses the training set data 170 to train the analysis model 124 to generate sub-word embedding data 156, combined vector data 158, term clustering data 160, and augmented query data 162.

In one embodiment, the training set data 170 is utilized by the data management system 112 to generate the word embedding data 164, i.e., vector representations of the words found in the training set data 170. In one embodiment, the training module 130 utilizes the training set data 170 to train the analysis model 124 to generate the word embedding data 164. Alternatively, another model or subsystem of the data management system 112 can generate the word embedding data 164 utilizing the training set data 170, or another set of data.

In one embodiment, the training module 130 trains the analysis model 124 to generate the keywords data 166 from the training set data. The analysis model 124 can generate the keywords data 166 by finding the K nearest neighbors in the vector space of a series of keywords associated with the data management system 112. Additionally, or alternatively, the keywords data 166 can include related words and synonyms and selected by experts.

In one embodiment, the data management system 112 generates the training set data 170 by first receiving raw text data and cleaning the raw text data by removing HTML tags and other markers or references which are not useful for learning. In one embodiment, this is followed by creating multiple versions of the training set data 170. The multiple versions of the training set data 170 can include a first training set for training the analysis model 124 to generate the sub-word embeddings. The multiple versions of the training set data can include a second training set including documents sent to the search engine 122 for indexing. The training set data 170 can include the validation data set consisting of <query(q), answer(a)> tuples where "a" is the ground truth answer for query "q". The training set data 170 can include a dataset consisting of the keywords/primary entities relevant for the dataset. The keywords can include an output of named entity recognition models or can be hand-curated.

In one embodiment, the training module 130 trains the analysis model 124 to generate sub-word embedding data 156. Training happens on multiple cores in parallel using a novel algorithm which is a variant of the skip-gram algorithm, or another vectorization algorithm, according to various embodiments.

In one embodiment, after training the analysis model 124 to generate sub-word embedding data 156, the top 10 nearest neighbors are determined for every entity/keyword in the training set data 170. In one embodiment, the keywords and their nearest neighbors are stored in the keywords database 126 in a hashmap for quick retrieval and also stored on disk in a "search-synonyms" file.

In one embodiment, the search engine 122 can include Elasticsearch, Apache Solr, or other known search engines 122. These tools have provision for a "synonyms" file and custom analyzers which modify the way in which documents are indexed. This ensures that the postings list is expanded to treat neighbors of a keyword as words equivalent to the keyword. The "search-synonyms" file included in the keywords data 166 can be used as the "synonyms" file for the search engine 122.

In one embodiment, when the data management system 112 encounters an OOV word, the data management system 112 first generates an embedding of the OOV word and then performs a nearest neighbors lookup in the word embedding data 164. This allows the data management system 112 to perform real-time query expansion even for OOV words. The data management system 112 represents an improvement over prior art systems because the data management system 112 works even with entirely unstructured text data while traditional data management systems work only on structured datasets like knowledge graphs and need a well formulated ontology.

In addition, the data management system 112 represents an improvement over traditional systems because the data management system 112 is much more flexible than prior art systems in that the data management system 112 does not rely on hand-crafted rules like edit distance and dictionaries to map words to synonyms, but rather uses machine learning approaches and is an end-end system needing no human intervention. In addition, the data management system 112 represents an improvement over traditional systems because the disclosed method and system leverages sub-word embeddings to create machine learned synonyms and integrate them with the search engine 122 to create an end-to-end system for semantic search. Further, data management system 112 can handle OOV words in a natural way.

Embodiments of the present disclosure address some of the shortcomings associated with traditional data management. A data management system in accordance with embodiments of the present disclosure utilizes sub-word embeddings in order to provide accurate assistance to users in a reduced amount of time. The various embodiments of the disclosure can be implemented to improve the technical fields of electronic data management, data processing, data transmission, and data storage. Therefore, the various described embodiments of the disclosure and their associated benefits amount to significantly more than an abstract idea. In particular, by providing accurate and assistance to users, electronic data management is significantly improved.

Figure 2:
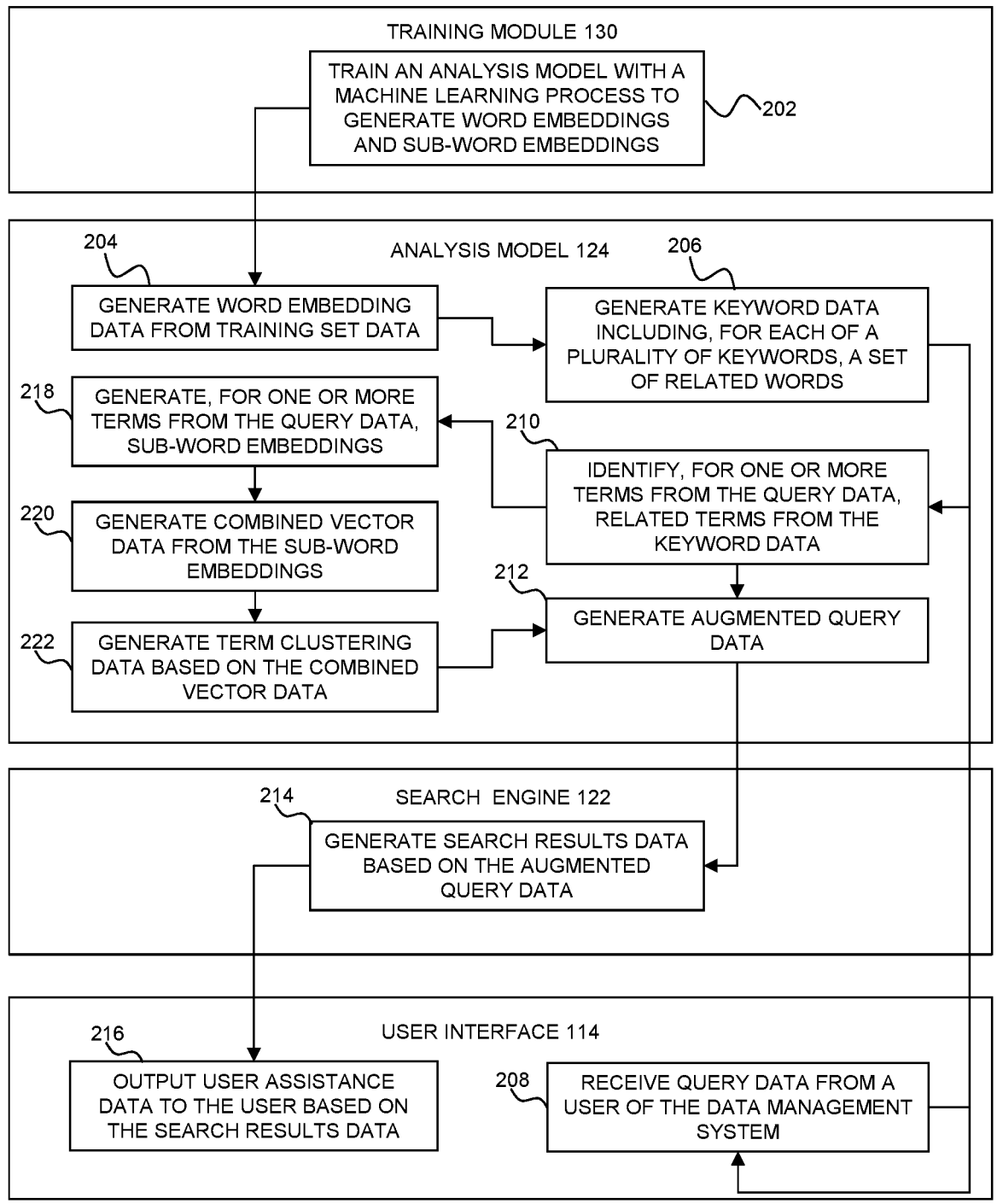
FIG. 2 is a block diagram of a process for accurately identifying the needs of users of a data management system, in accordance with one embodiment.

FIG. 2 illustrates a functional flow diagram of a process 200 for accurately identifying the needs of users of a data management system, in accordance with one embodiment.

Referring to FIG. 2, FIG. 1, and the description of FIG. 1 above, at block 202 the training module 130 trains an analysis model with a machine learning process to generate word embeddings and sub-word embeddings using any of the methods, processes, and procedures discussed above with respect to FIG. 1, according to one embodiment. From block 202 the process proceeds to block 204.

At block 204 the analysis model 124 generates word embedding data from training set data, using any of the methods, processes, and procedures discussed above with respect to FIG. 1, according to one embodiment. From block 204 the process proceeds to block 206.

At block 206 the analysis model 124 generates keyword data including, for each of a plurality of keywords, a set of related words, using any of the methods, processes, and procedures discussed above with respect to FIG. 1, according to one embodiment. From block 206 the process proceeds to block 208.

At block 208, the user interface 114 receives query data from a user of the data management system, using any of the methods, processes, and procedures discussed above with respect to FIG. 1, according to one embodiment. From block 208 the process proceeds to block 210.

At block 210 the analysis model 124 identifies, for one or more terms from the query data, related terms from the keyword data, using any of the methods, processes, and procedures discussed above with respect to FIG. 1, according to one embodiment. If the analysis model 124 successfully identifies related terms from the keyword data at 210, then from block 210 the process proceeds to block 212.

At block 212 the analysis model 124 generates augmented query data based on the related terms from the keyword data, using any of the methods, processes, and procedures discussed above with respect to FIG. 1, according to one embodiment. From block 212 to block 214.

At block 214 the search engine 122 generates search results data based on the augmented query data, using any of the methods, processes, and procedures discussed above with respect to FIG. 1, according to one embodiment. From block 214 to block 216.

At block 216 the user interface 114 outputs user assistance data to the user based on the search results data, using any of the methods, processes, and procedures discussed above with respect to FIG. 1, according to one embodiment.

If, at block 210, the analysis model 124 is not able to identify related terms from the keyword data, then from block 210 the process proceeds to block 218.

At block 218 the analysis model 124 generates, for one or more terms from the query data, sub-word embeddings, using any of the methods, processes, and procedures discussed above with respect to FIG. 1, according to one embodiment. From block 218 to block 220.

At block 220 the analysis model 124 generates combined vector data from the sub-word embeddings, using any of the methods, processes, and procedures discussed above with respect to FIG. 1, according to one embodiment. From block 220 to block 222.

At block 222 the analysis model 124 generates term clustering data based on the combined vector data, using any of the methods, processes, and procedures discussed above with respect to FIG. 1, according to one embodiment. From block 222 to block 212.

At block 212 the analysis model 124 generates augmented query data based on the term clustering data, using any of the methods, processes, and procedures discussed above with respect to FIG. 1, according to one embodiment. From block 212 to block 214, and then to block 216.

Those of skill in the art will recognize, in light of the present disclosure, that the process 200 can include different steps, different orders of steps, other than those represented in FIG. 2. All such other processes fall within the scope of the present disclosure.

In one embodiment, after blocks 202, 204, and 206 are performed, blocks 208-222 may be performed and repeated multiple times.

In one embodiment, blocks 218-222 may be performed even if, at block 210, the analysis model 124 successfully identifies one or more related terms from the keyword data. In this case, at block 212, the analysis model 124 can generate augmented query data from the related terms in the keyword data and the clustering data.

In one embodiment, the query data may include multiple terms. The process 200 may proceed from block 210 to block 212 for some terms, and from block 210 to block 218 for other terms.

In one embodiment, at block 222, the clustering data may indicate one or more terms related to the term under analysis. The process 200 may then identify other related terms in the keyword data based on the clustering data and generates the augmented query data based on the keyword data and the clustering data.

Figure 3:
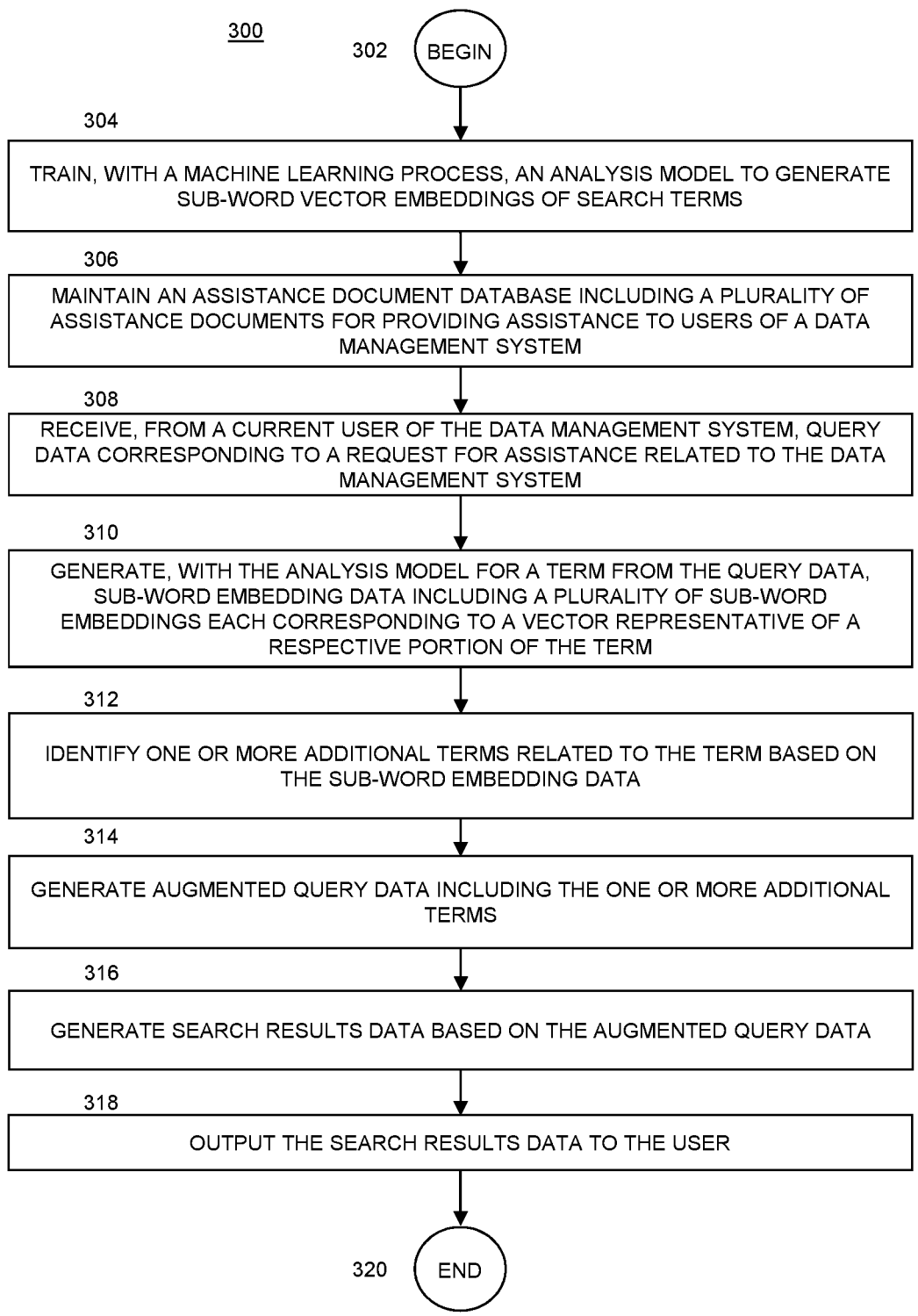
FIG. 3 is a flow diagram of a process for accurately identifying the needs of users of a data management system, in accordance with one embodiment.

FIG. 3 illustrates a flow diagram of a process 300 for accurately identifying the needs of users of a data management system, according to various embodiments.

Referring to FIGS. 1-3, and the description of FIGS. 1-2 above, in one embodiment, process 300 begins at BEGIN 302 and process flow proceeds to TRAIN, WITH A MACHINE LEARNING PROCESS, AN ANALYSIS MODEL TO GENERATE SUB-WORD VECTOR EMBEDDINGS OF SEARCH TERMS 304.

In one embodiment, at TRAIN, WITH A MACHINE LEARNING PROCESS, AN ANALYSIS MODEL TO GENERATE SUB-WORD VECTOR EMBEDDINGS OF SEARCH TERMS 304, an analysis model is trained, with a machine learning process, to generate sub-word vector embeddings of search terms, using any of the methods, processes, and procedures discussed above with respect to FIGS. 1-2.

In one embodiment, once an analysis model is trained, with a machine learning process, to generate sub-word vector embeddings of search terms at TRAIN, WITH A MACHINE LEARNING PROCESS, AN ANALYSIS MODEL TO GENERATE SUB-WORD VECTOR EMBEDDINGS OF SEARCH TERMS 304 process flow proceeds to MAINTAIN AN ASSISTANCE DOCUMENT DATABASE INCLUDING A PLURALITY OF ASSISTANCE DOCUMENTS FOR PROVIDING ASSISTANCE TO USERS OF A DATA MANAGEMENT SYSTEM 306.

In one embodiment, at MAINTAIN AN ASSISTANCE DOCUMENT DATABASE INCLUDING A PLURALITY OF ASSISTANCE DOCUMENTS FOR PROVIDING ASSISTANCE TO USERS OF A DATA MANAGEMENT SYSTEM 306, an assistance document database is maintained including a plurality of assistance documents for providing assistance to users of a data management system, using any of the methods, processes, and procedures discussed above with respect to FIGS. 1-2.

In one embodiment, once an assistance document database is maintained including a plurality of assistance documents for providing assistance to users of a data management system at MAINTAIN AN ASSISTANCE DOCUMENT DATABASE INCLUDING A PLURALITY OF ASSISTANCE DOCUMENTS FOR PROVIDING ASSISTANCE TO USERS OF A DATA MANAGEMENT SYSTEM 306, process flow proceeds to RECEIVE, FROM A CURRENT USER OF THE DATA MANAGEMENT SYSTEM, QUERY DATA CORRESPONDING TO A REQUEST FOR ASSISTANCE RELATED TO THE DATA MANAGEMENT SYSTEM 308.

In one embodiment, at RECEIVE, FROM A CURRENT USER OF THE DATA MANAGEMENT SYSTEM, QUERY DATA CORRESPONDING TO A REQUEST FOR ASSISTANCE RELATED TO THE DATA MANAGEMENT SYSTEM 308, query data is received, from a current user of the data management system, corresponding to a request for assistance related to the data management system, using any of the methods, processes, and procedures discussed above with respect to FIGS. 1-2.

In one embodiment, once d query data is received, from a current user of the data management system, corresponding to a request for assistance related to the data management system at RECEIVE, FROM A CURRENT USER OF THE DATA MANAGEMENT SYSTEM, QUERY DATA CORRESPONDING TO A REQUEST FOR ASSISTANCE RELATED TO THE DATA MANAGEMENT SYSTEM 308, process flow proceeds to GENERATE, WITH THE ANALYSIS MODEL FOR A TERM FROM THE QUERY DATA, SUB-WORD EMBEDDING DATA INCLUDING A PLURALITY OF SUB-WORD EMBEDDINGS EACH CORRESPONDING TO A VECTOR REPRESENTATIVE OF A RESPECTIVE PORTION OF THE TERM 310.

In one embodiment, at GENERATE, WITH THE ANALYSIS MODEL FOR A TERM FROM THE QUERY DATA, SUB-WORD EMBEDDING DATA INCLUDING A PLURALITY OF SUB-WORD EMBEDDINGS EACH CORRESPONDING TO A VECTOR REPRESENTATIVE OF A RESPECTIVE PORTION OF THE TERM 310, sub-word embedding data is generated, with the analysis model for a term from the query data, including a plurality of sub-word embeddings each corresponding to a vector representative of a respective portion of the term, using any of the methods, processes, and procedures discussed above with respect to FIGS. 1-2.

In one embodiment, once sub-word embedding data is generated, with the analysis model for a term from the query data, including a plurality of sub-word embeddings each corresponding to a vector representative of a respective portion of the term at GENERATE, WITH THE ANALYSIS MODEL FOR A TERM FROM THE QUERY DATA, SUB-WORD EMBEDDING DATA INCLUDING A PLURALITY OF SUB-WORD EMBEDDINGS EACH CORRESPONDING TO A VECTOR REPRESENTATIVE OF A RESPECTIVE PORTION OF THE TERM 310, process flow proceeds to IDENTIFY ONE OR MORE ADDITIONAL TERMS RELATED TO THE TERM BASED ON THE SUB-WORD EMBEDDING DATA 312.

In one embodiment, at IDENTIFY ONE OR MORE ADDITIONAL TERMS RELATED TO THE TERM BASED ON THE SUB-WORD EMBEDDING DATA 312, one or more additional terms is identified related to the term based on the sub-word embedding data, using any of the methods, processes, and procedures discussed above with respect to FIGS. 1-2.

In one embodiment, once one or more additional terms is identified related to the term based on the sub-word embedding data at IDENTIFY ONE OR MORE ADDITIONAL TERMS RELATED TO THE TERM BASED ON THE SUB-WORD EMBEDDING DATA 312, process flow proceeds to GENERATE AUGMENTED QUERY DATA INCLUDING THE ONE OR MORE ADDITIONAL TERMS 314.

In one embodiment, at GENERATE AUGMENTED QUERY DATA INCLUDING THE ONE OR MORE ADDITIONAL TERMS 314 augmented query data is generated including the one or more additional terms, using any of the methods, processes, and procedures discussed above with respect to FIGS. 1-2.

In one embodiment, once augmented query data is generated including the one or more additional terms at GENERATE AUGMENTED QUERY DATA INCLUDING THE ONE OR MORE ADDITIONAL TERMS 314, process flow proceeds to GENERATE SEARCH RESULTS DATA BASED ON THE AUGMENTED QUERY DATA 316.

In one embodiment, at GENERATE SEARCH RESULTS DATA BASED ON THE AUGMENTED QUERY DATA 316 search results data is generated based on the augmented query data, using any of the methods, processes, and procedures discussed above with respect to FIGS. 1-2.

In one embodiment, once search results data is generated based on the augmented query data at GENERATE SEARCH RESULTS DATA BASED ON THE AUGMENTED QUERY DATA 316, process flow proceeds to OUTPUT THE SEARCH RESULTS DATA TO THE USER 318.

In one embodiment, at OUTPUT THE SEARCH RESULTS DATA TO THE USER 318 the search results data is output to the user, using any of the methods, processes, and procedures discussed above with respect to FIGS. 1-2.

In one embodiment, once the search results data is output to the user at OUTPUT THE SEARCH RESULTS DATA TO THE USER 318, process flow proceeds to END 320.

In one embodiment, at END 320 the process for accurately identifying the needs of users of a data management system is exited to await new data and/or instructions.

Figure 4:
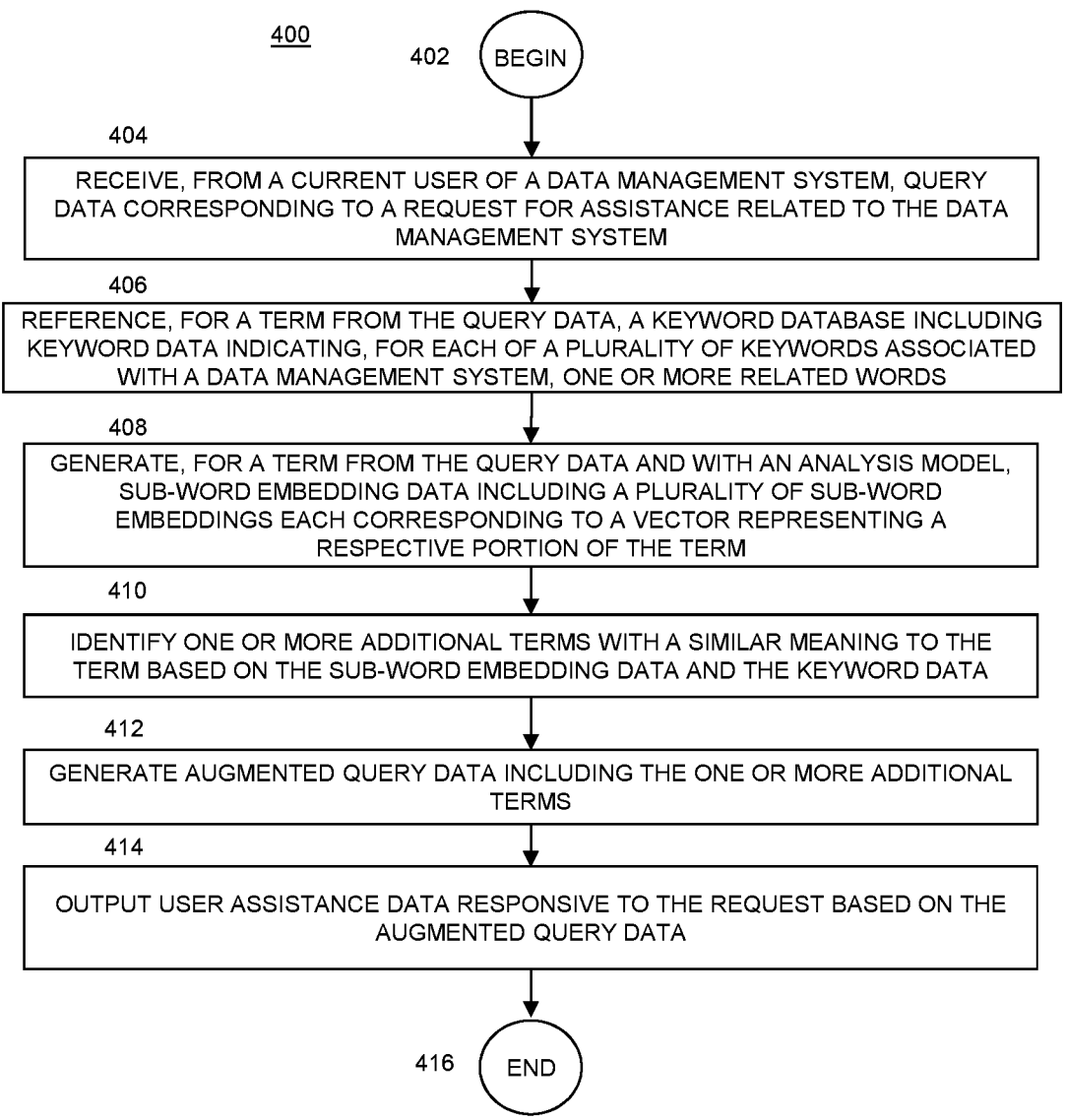
FIG. 4 is a flow diagram of a process for accurately identifying the needs of users of a data management system, in accordance with one embodiment.

FIG. 4 illustrates a flow diagram of a process 400 for accurately identifying the needs of users of a data management system, according to various embodiments.

Referring to FIG. 4, FIGS. 1-2, and the description of FIGS. 1-2 above, in one embodiment, process 400 begins at BEGIN 402 and process flow proceeds to RECEIVE, FROM A CURRENT USER OF A DATA MANAGEMENT SYSTEM, QUERY DATA CORRESPONDING TO A REQUEST FOR ASSISTANCE RELATED TO THE DATA MANAGEMENT SYSTEM 404.

In one embodiment, at RECEIVE, FROM A CURRENT USER OF A DATA MANAGEMENT SYSTEM, QUERY DATA CORRESPONDING TO A REQUEST FOR ASSISTANCE RELATED TO THE DATA MANAGEMENT SYSTEM 404, query data is received, from a current user of a data management system, corresponding to a request for assistance related to the data management system, using any of the methods, processes, and procedures discussed above with respect to FIGS. 1-2.

In one embodiment, once query data is received, from a current user of a data management system, corresponding to a request for assistance related to the data management system at RECEIVE, FROM A CURRENT USER OF A DATA MANAGEMENT SYSTEM, QUERY DATA CORRESPONDING TO A REQUEST FOR ASSISTANCE RELATED TO THE DATA MANAGEMENT SYSTEM 404 process flow proceeds to REFERENCE, FOR A TERM FROM THE QUERY DATA, A KEYWORD DATABASE INCLUDING KEYWORD DATA INDICATING, FOR EACH OF A PLURALITY OF KEYWORDS ASSOCIATED WITH A DATA MANAGEMENT SYSTEM, ONE OR MORE RELATED WORDS 406.

In one embodiment, at REFERENCE, FOR A TERM FROM THE QUERY DATA, A KEYWORD DATABASE INCLUDING KEYWORD DATA INDICATING, FOR EACH OF A PLURALITY OF KEYWORDS ASSOCIATED WITH A DATA MANAGEMENT SYSTEM, ONE OR MORE RELATED WORDS 406, a keyword database is referenced, for a term from the query data, including keyword data indicating, for each of a plurality of keywords associated with a data management system, one or more related words, using any of the methods, processes, and procedures discussed above with respect to FIGS. 1-2.

In one embodiment, once a keyword database is referenced, for a term from the query data, including keyword data indicating, for each of a plurality of keywords associated with a data management system, one or more related words at REFERENCE, FOR A TERM FROM THE QUERY DATA, A KEYWORD DATABASE INCLUDING KEYWORD DATA INDICATING, FOR EACH OF A PLURALITY OF KEYWORDS ASSOCIATED WITH A DATA MANAGEMENT SYSTEM, ONE OR MORE RELATED WORDS 406, process flow proceeds to GENERATE, FOR A TERM FROM THE QUERY DATA AND WITH AN ANALYSIS MODEL, SUB-WORD EMBEDDING DATA INCLUDING A PLURALITY OF SUB-WORD EMBEDDINGS EACH CORRESPONDING TO A VECTOR REPRESENTING A RESPECTIVE PORTION OF THE TERM 408.

In one embodiment, at GENERATE, FOR A TERM FROM THE QUERY DATA AND WITH AN ANALYSIS MODEL, SUB-WORD EMBEDDING DATA INCLUDING A PLURALITY OF SUB-WORD EMBEDDINGS EACH CORRESPONDING TO A VECTOR REPRESENTING A RESPECTIVE PORTION OF THE TERM 408, sub-word embedding data is generated, for a term from the query data and with an analysis model, including a plurality of sub-word embeddings each corresponding to a vector representing a respective portion of the term, using any of the methods, processes, and procedures discussed above with respect to FIGS. 1-2.

In one embodiment, once sub-word embedding data is generated, for a term from the query data and with an analysis model, including a plurality of sub-word embeddings each corresponding to a vector representing a respective portion of the term at GENERATE, FOR A TERM FROM THE QUERY DATA AND WITH AN ANALYSIS MODEL, SUB-WORD EMBEDDING DATA INCLUDING A PLURALITY OF SUB-WORD EMBEDDINGS EACH CORRESPONDING TO A VECTOR REPRESENTING A RESPECTIVE PORTION OF THE TERM 408, process flow proceeds to IDENTIFY ONE OR MORE ADDITIONAL TERMS WITH A SIMILAR MEANING TO THE TERM BASED ON THE SUB-WORD EMBEDDING DATA AND THE KEYWORD DATA 410.

In one embodiment, at IDENTIFY ONE OR MORE ADDITIONAL TERMS WITH A SIMILAR MEANING TO THE TERM BASED ON THE SUB-WORD EMBEDDING DATA AND THE KEYWORD DATA 410, one or more additional terms are identified with a similar meaning to the term based on the sub-word embedding data and the keyword data, using any of the methods, processes, and procedures discussed above with respect to FIGS. 1-2.

In one embodiment, once one or more additional terms are identified with a similar meaning to the term based on the sub-word embedding data and the keyword data at IDENTIFY ONE OR MORE ADDITIONAL TERMS WITH A SIMILAR MEANING TO THE TERM BASED ON THE SUB-WORD EMBEDDING DATA AND THE KEYWORD DATA 410, process flow proceeds to GENERATE AUGMENTED QUERY DATA INCLUDING THE ONE OR MORE ADDITIONAL TERMS 412.

In one embodiment, at GENERATE AUGMENTED QUERY DATA INCLUDING THE ONE OR MORE ADDITIONAL TERMS 412, augmented query data is generated including the one or more additional terms, using any of the methods, processes, and procedures discussed above with respect to FIGS. 1-2.

In one embodiment, once augmented query data is generated including the one or more additional terms at GENERATE AUGMENTED QUERY DATA INCLUDING THE ONE OR MORE ADDITIONAL TERMS 412, process flow proceeds to OUTPUT USER ASSISTANCE DATA RESPONSIVE TO THE REQUEST BASED ON THE AUGMENTED QUERY DATA 414.

In one embodiment, at OUTPUT USER ASSISTANCE DATA RESPONSIVE TO THE REQUEST BASED ON THE AUGMENTED QUERY DATA 414, user assistance data is output responsive to the request based on the augmented query data, using any of the methods, processes, and procedures discussed above with respect to FIGS. 1-2.

In one embodiment, once user assistance data is output responsive to the request based on the augmented query data at OUTPUT USER ASSISTANCE DATA RESPONSIVE TO THE REQUEST BASED ON THE AUGMENTED QUERY DATA 414, process flow proceeds to END 416.

In one embodiment, at END 416 the process for accurately identifying the needs of users of a data management system is exited to await new data and/or instructions.

As noted above, the specific illustrative examples discussed above are but illustrative examples of implementations of embodiments of the method or process for accurately identifying the needs of users of a data management system. Those of skill in the art will readily recognize that other implementations and embodiments are possible. Therefore, the discussion above should not be construed as a limitation on the claims provided below.

In one embodiment, a computing system implemented method accurately identifies the needs of users of a data management system. The method includes training, with a machine learning process, an analysis model to generate sub-word vector embeddings of search terms, maintaining an assistance document database including a plurality of assistance documents for providing assistance to users of a data management system, and receiving, from a current user of the data management system, query data corresponding to a request for assistance related to the data management system. The method includes generating, with the analysis model for a term from the query data, sub-word embedding data including a plurality of sub-word embeddings each corresponding to a vector representative of a respective portion of the term and identifying one or more additional terms related to the term based on the sub-word embedding data. The method includes generating augmented query data including the one or more additional terms, generating search results data based on the augmented query data, and outputting the search results data to the user.

In one embodiment, a computing system implemented method accurately identifies the needs of users of a data management system. The method includes receiving, from a current user of a data management system, query data corresponding to a request for assistance related to the data management system and referencing, for a term from the query data, a keyword database including keyword data indicating, for each of a plurality of keywords associated with a data management system, one or more related words. The method includes generating, for a term from the query data and with an analysis model, sub-word embedding data including a plurality of sub-word embeddings each corresponding to a vector representing a respective portion of the term and identifying one or more additional terms with a similar meaning to the term based on the sub-word embedding data and the keyword data; generating augmented query data including the one or more additional terms. The method includes outputting user assistance data responsive to the request based on the augmented query data.

In one embodiment, a system for accurately identifying the needs of users of a data management system includes at least one processor and at least one memory coupled to the at least one processor. The at least one memory has stored therein instructions which, when executed by any set of the one or more processors, perform a process. The process includes training, with a machine learning process, an analysis model to generate sub-word vector embeddings of search terms and maintaining a keyword database including keyword data indicating, for each of a plurality of keywords associated with a data management system, one or more related words. The process includes receiving, from a current user of the data management system, query data corresponding to a request for assistance related to the data management system and generating, for a term from the query data and with the analysis model, sub-word embedding data including a plurality of sub-word embeddings each corresponding to a vector representing a respective portion of the term. The process includes identifying one or more additional terms with a similar meaning to the term based on the sub-word embedding data and the keyword data, generating augmented query data including the one or more additional terms, and outputting user assistance data responsive to the request based on the augmented query data.

In one embodiment, a system for accurately identifying the needs of users of a data management system includes at least one processor and at least one memory coupled to the at least one processor. The at least one memory has stored therein instructions which, when executed by any set of the one or more processors, perform a process. The process includes training, with a machine learning process, an analysis model to generate sub-word vector embeddings of search terms, maintaining an assistance document database including a plurality of assistance documents for providing assistance to users of a data management system, and receiving, from a current user of the data management system, query data corresponding to a request for assistance related to the data management system. The process includes generating, with the analysis model for a term from the query data, sub-word embedding data including a plurality of sub-word embeddings each corresponding to a vector representative of a respective portion of the term and identifying one or more additional terms related to the term based on the sub-word embedding data and generating augmented query data including the one or more additional terms. The process includes generating search results data based on the augmented query data and outputting the search results data to the user.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

As used herein, the term query includes, but is not limited to a textual query provided by a user to a data management system and an audible spoken query provided by a user to a data management system. As used herein, the term query data includes, but is not limited to the data representing a textual query or an audible spoken query.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for generating accurate search results, the method performed by one or more processors of a system and comprising:
    training, with a machine learning process, an analysis model to generate sub-word embeddings based on search terms received from system users;
    receiving, from a system user, a query including a plurality of search terms;
    identifying at least one term of the plurality of search terms not included in a keyword database of the system;
    separating the at least one term into a plurality of word segments each having a same length;
    using the trained analysis model to generate, for each respective word segment of the plurality of word segments, a sub-word embedding corresponding to a vector representative of the respective word segment;
    combining each of the corresponding vectors for the generated sub-word embeddings into a single vector representative of the at least one term;
    identifying, in the keyword database, one or more additional terms related to the at least one term based on the single vector;
    generating search results for the query based at least in part on the one or more additional terms; and
    outputting the search results to the system user.

2. The method of claim 1, wherein generating the search results data includes identifying, in an assistance documents database, one or more assistance documents likely to be relevant to the query.

3. The method of claim 1, wherein identifying the one or more additional terms is based on a vector clustering process.

4. The method of claim 1, wherein identifying the one or more additional terms is based on a vector clustering algorithm.

5. The method of claim 1, wherein identifying the one or more additional terms includes referencing the keyword database.

6. The method of claim 1, wherein generating the search results is based on the keyword database.

7. The method of claim 1, wherein each sub-model of a plurality of system sub-models performs a different portion of the machine learning process.

8. The method of claim 1, wherein the analysis model is a Continuous Bag of Words model.

9. The method of claim 1, wherein the system is a financial management system.

10. The method of claim 1, further comprising:
    calculating at least one of a Euclidian distance or a Hamming distance between the single vector and one or more vectors previously generated by the system.

11. The method of claim 1, further comprising:
    generating a hash map based on search terms included in the keyword database.

12. A system for generating accurate search results, the system comprising:
    one or more processors; and
    at least one memory coupled to the one or more processors and storing instructions that, when executed by the one or more processors, cause the system to perform operations including:
        training, with a machine learning process, an analysis model to generate sub-word embeddings based on search terms received from system users;
        receiving, from a system user, a query including a plurality of search terms;
        identifying at least one term of the plurality of search terms not included in a keyword database of the system;
        separating the at least one term into a plurality of word segments each having a same length;
        using the trained analysis model to generate, for each respective word segment of the plurality of word segments, a sub-word embedding corresponding to a vector representative of the respective word segment;
        combining each of the corresponding vectors for the generated sub-word embeddings into a single vector representative of the at least one term;
        identifying, in the keyword database, one or more additional terms related to the at least one term based on the single vector;
        generating search results for the query based at least in part on the one or more additional terms; and
        outputting the search results to the system user.

13. The system of claim 12, wherein generating the search results data includes identifying, in an assistance documents database, one or more assistance documents likely to be relevant to the query.

14. The system of claim 12, wherein identifying the one or more additional terms is based on a vector clustering process.

15. The system of claim 12, wherein identifying the one or more additional terms is based on a vector clustering algorithm.

16. The system of claim 12, wherein identifying the one or more additional terms includes referencing the keyword database.

17. The system of claim 12, wherein generating the search results is based on the keyword database.

18. The system of claim 12, wherein each sub-model of a plurality of system sub-models performs a different portion of the machine learning process.

19. The system of claim 12, wherein the analysis model is a Continuous Bag of Words model.

20. The system of claim 12, wherein the system is a financial management system.

21. The system of claim 12, wherein execution of the instructions causes the system to perform operations further including:
    calculating at least one of a Euclidian distance or a Hamming distance between the single vector and one or more vectors previously generated by the system.

22. The system of claim 12, wherein execution of the instructions causes the system to perform operations further including:
    generating a hash map based on search terms included in the keyword database.

* * * * *